(12) United States Patent
Cherian et al.

(10) Patent No.: US 8,751,862 B2
(45) Date of Patent: Jun. 10, 2014

(54) SYSTEM AND METHOD TO SUPPORT BACKGROUND INITIALIZATION FOR CONTROLLER THAT SUPPORTS FAST REBUILD USING IN BLOCK DATA

(75) Inventors: Jacob Cherian, Austin, TX (US); Rohit Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 466 days.

(21) Appl. No.: 11/837,096

(22) Filed: Aug. 10, 2007

(65) Prior Publication Data

US 2009/0044043 A1     Feb. 12, 2009

(51) Int. Cl.
*G06F 11/00*     (2006.01)
(52) U.S. Cl.
USPC ......................................................... 714/6.24
(58) Field of Classification Search
USPC ......................................................... 714/6.24
See application file for complete search history.

(56) References Cited

U.S. PATENT DOCUMENTS

| | | | | |
|---|---|---|---|---|
| 5,581,690 A | * | 12/1996 | Ellis et al. | 714/6 |
| 6,567,892 B1 | * | 5/2003 | Horst et al. | 711/114 |
| 6,898,668 B2 | * | 5/2005 | Thompson et al. | 711/114 |
| 2005/0015653 A1 | * | 1/2005 | Hajji et al. | 714/6 |

OTHER PUBLICATIONS

IBM TDB "Rebuild only used Space in Update in place disk array" Jun. 1995, vol. 38, issue 6, pp. 485-488.*

* cited by examiner

*Primary Examiner* — Bryce Bonzo
(74) *Attorney, Agent, or Firm* — Terrile, Cannatti, Chambers & Holland, LLP; Stephen A. Terrile (57) ABSTRACT

A fast rebuild mechanism that includes a background initialization mechanism. The fast rebuild mechanism allows a RAID controller to be made aware of what blocks are actually in use so that only those blocks are rebuilt after a disk drive failure. The fast rebuild mechanism also includes functionality for an IO controller (such as storage controller) to detect whether a block has stored data to indicate that the block has valid data when the block is accessed.

15 Claims, 11 Drawing Sheets

SYSTEM AND METHOD TO SUPPORT BACKGROUND INITIALIZATION FOR CONTROLLER THAT SUPPORTS FAST REBUILD USING IN BLOCK DATA

BACKGROUND OF THE INVENTION

1. Field of the Invention

The present invention relates to information handling systems and more particularly, to improving background initialization for information handling systems that support a fast rebuild operation.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide an information handling system with a storage system such as a Redundant Array of Inexpensive Disks (RAID) storage system. In a RAID, a set of disks are organized into a single, large, logical disk. Each disk in the set typically has the same number of platters and the same number of tracks on each platter where the data is actually stored. The data is striped across multiple disks to improve read/write speeds, and redundant information is stored on the disks to improve the availability of data (reliability) in the event of catastrophic disk failures. The RAID secondary storage system can typically rebuild the failed data disk via a rebuild operation, without involving the file system, by regenerating each bit of data in each track and platter of the failed disk (using its knowledge of the redundant information), and then storing each such bit in corresponding locations of a new, replacement disk.

There are a number of issues relating to rebuild operations. For example, as disk capacity increases, the time to degraded volume increases and hence the time that a customer is exposed to possible loss of data due to additional disk drive failure increases. Also, rebuild operations often require 10 accesses to disk that means that host accesses to disk drives are affected resulting in degraded performance.

Known rebuild algorithms are not often aware of which blocks of a disk are in actual use (i.e., valid user data). Also, for parity based RAID systems, the number of operations for write and read operations increases significantly when the RAID virtual disk is degraded.

Also, with solutions that use of a fast rebuild operation, it is would be desirable to be able to provide a background initialization function so that a virtual disk is available soon after the virtual disk is created without waiting for a foreground initialization to complete.

SUMMARY

In accordance with an aspect of the present invention, a fast rebuild mechanism which includes a background initialization mechanism is set forth. The fast rebuild mechanism allows a RAID controller to be made aware of what blocks are actually in use so that only those blocks are rebuilt after a disk drive failure. The fast rebuild mechanism also includes functionality for an IO controller (such as storage controller) to detect whether a block has stored data to indicate that the block has valid data when the block is accessed.

The fast rebuild mechanism also includes a maintenance operation that can be used to clear valid data block flags on blocks that are no longer in use. The operation may be manually initiated through a host based service to transmit information on what blocks are in actual use and what are not. The fast rebuild mechanism (e.g., controller firmware) then uses this information to clear the flags on the blocks that are no longer in use.

More specifically, in one embodiment, the invention relates to a method for performing a background initialization fast rebuild operation on a Redundant Array of Inexpensive Disks (RAID) system which includes providing the RAID system with a virtual disk portion and a disk metadata portion. The disk metadata portion stores a fast rebuild operation indication to indicate whether the RAID system supports a fast rebuild operation and a virtual disk consistent indication to indicate whether the virtual disk is consistent and provides each block within the RAID system with a user data portion and a block information portion. The block information portion includes a valid block data indication, setting the virtual disk consistent indication to false, determining whether a block has valid data, indicating that the block has valid data via the valid block data indication, rebuilding only blocks that contain valid data after a disk drive failure based upon the fast rebuild operation indication and the valid block data indications, and after all blocks containing valid data have been rebuilt, setting the virtual disk consistent indication to true.

In another embodiment, the invention relates to an apparatus for performing a background initialization fast rebuild operation on a Redundant Array of Inexpensive Disks (RAID) system which includes a virtual disk portion and a disk metadata portion, the disk metadata portion storing a fast rebuild operation indication to indicate whether the RAID system supports a fast rebuild operation and a virtual disk consistent indication to indicate whether the virtual disk is consistent, means for providing each block within the RAID system with a user data portion and a block information portion, the block information portion including a valid block data indication, means for setting the virtual disk consistent indication to false, means for determining whether a block has valid data, means for indicating that the block has valid data via the valid block data indication, means for rebuilding only blocks that contain valid data after a disk drive failure based upon the fast rebuild operation indication and the valid block data indications, and means for setting the virtual disk consistent indication to true after all blocks containing valid data have been rebuilt.

In another embodiment, the invention relates to an information handling system that includes a processor, a memory coupled to the processor, and a Redundant Array of Inexpensive Disks (RAID) system. The RAID system is capable of performing a background initialization fast rebuild operation and includes a virtual disk portion and a disk metadata portion that stores a fast rebuild operation indication to indicate whether the RAID system supports a fast rebuild operation and a virtual disk consistent indication to indicate whether the virtual disk is consistent. The RAID system further includes instructions for providing each block within the RAID system with a user data portion and a block information portion, the block information portion including a valid block data indication, setting the virtual disk consistent indication to false, determining whether a block has valid data, indicating that the block has valid data via the valid block data indication, and rebuilding only blocks that contain valid data after a disk drive failure based upon the fast rebuild operation indication and the valid block data indications, and after all blocks containing valid data have been rebuilt, setting the virtual disk consistent indication to true.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1:
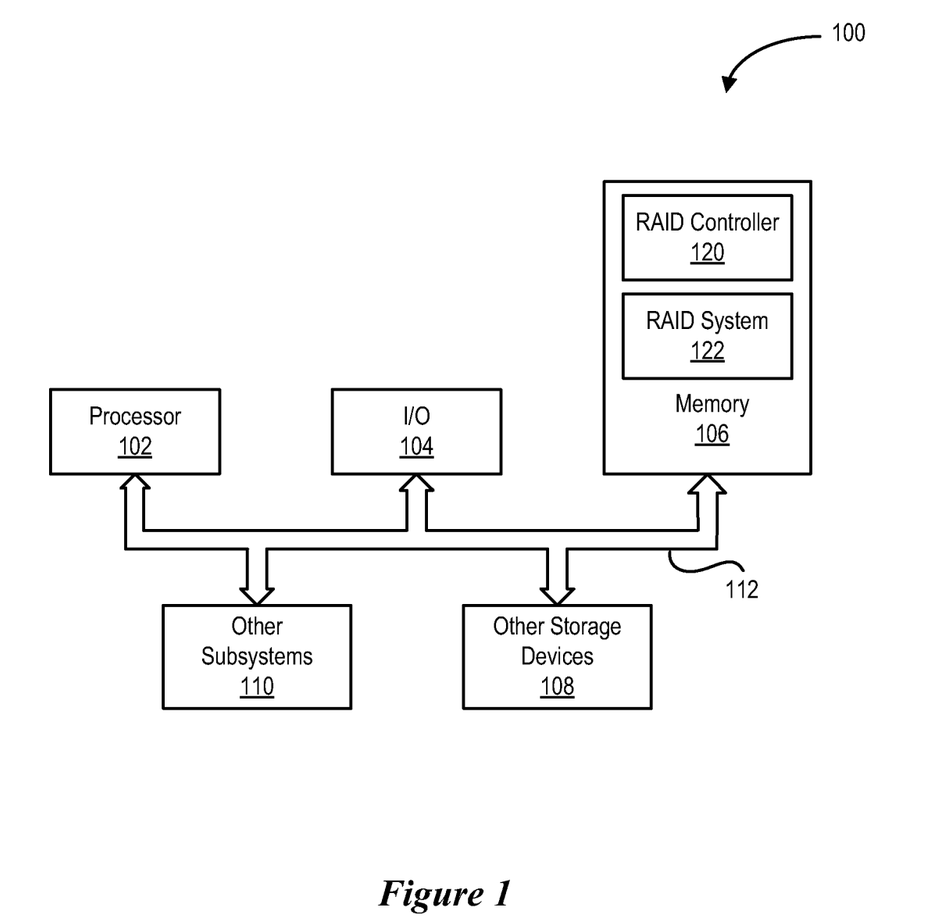
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers, memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112.

The memory 106 includes a RAID controller 120 as well as a RAID system 122 that includes a plurality of drives configured as a RAID device.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
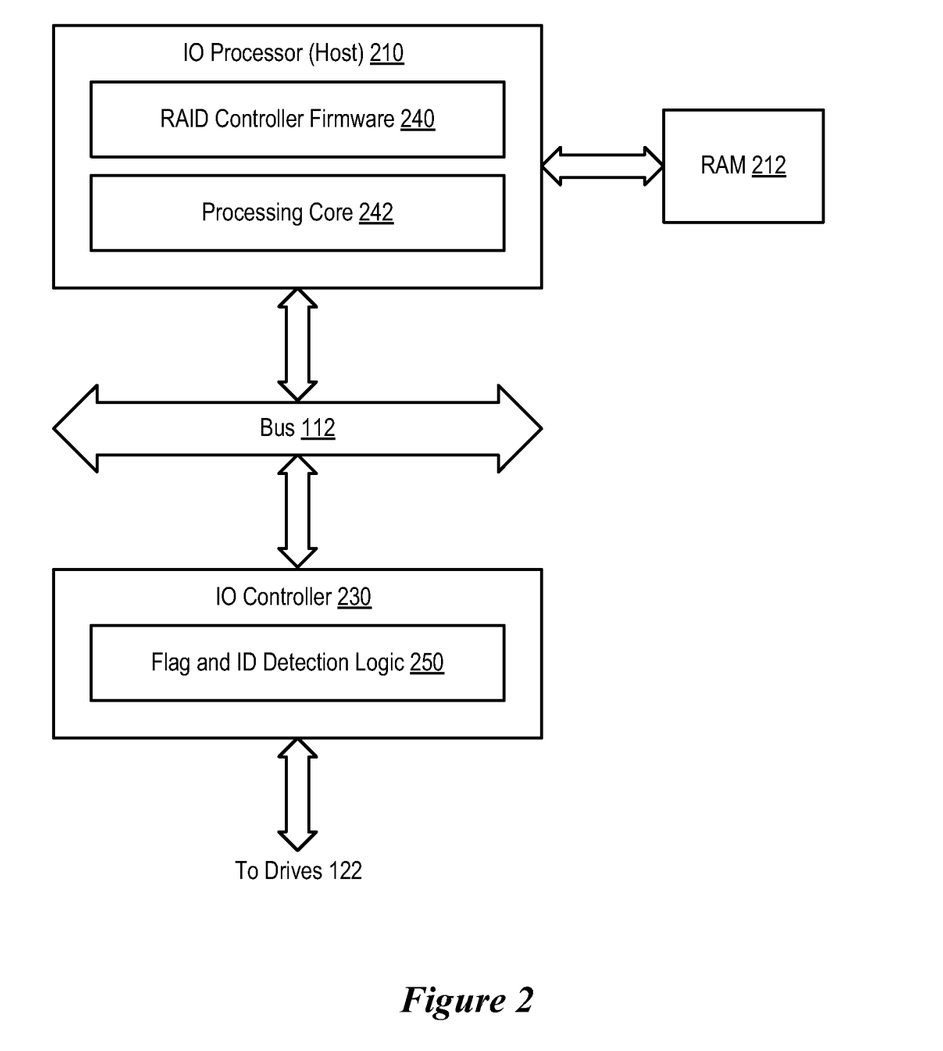
FIG. 2 shows a block diagram of a RAID controller.

Referring to FIG. 2, a block diagram of a RAID controller 120 is shown. The RAID controller 120 includes an 10 processor (IOP) 210. The IOP 210 is coupled to dedicated volatile memory (e.g., RAM) 212. The IOP 210 is also coupled to an IO controller 220 of the information handling system 100 via the bus 112. The dedicated IOP 210 handles all RAID functions and performs rebuilds, error recovery and any additional functions that are part of the feature set of the RAID system. The IOP 210 performs these operations independently of an operating system and thus enables many RAID tasks to execute outside of the operating system without affecting performance of the processor 102.

The IOP 210 executes RAID controller firmware 240 in its processing core 242. The IO controller 220 includes flag and ID detection logic 250. The RAID controller firmware 240 stores memory variables as well as metadata variables, flags and identifiers.

The memory variables include a last initialize block variable. The last initialize block variable (LastlnitializeBlock) identifiers the last block that has completed initialization during background initialization. The last initialize block variable is loaded with a Background Initialize Checkpoint when the RAID controller 120 is restarted, due to user action of restart of the information handing system 100.

The metadata variables, flags, and identifiers include a fast rebuild supported indication (FastRebuildSupported), as well as a virtual disk consistent indication (VirtualDiskConsistent) and a background initialize checkpoint (BackgroundlnitializeCheckpoint) value. The fast rebuild supported indication is a flag that is stored in RAID metadata to indicate that the RAID system supports fast rebuild. The fast rebuild supported indication is useful during RAID migration for importing controllers that support the fast rebuild feature to enable the fast rebuild feature for the virtual disk. The fast rebuild supported indication is meaningless to a controller that does not support the fast rebuild feature. The virtual disk consistent indication is a flag is stored in the RAID metadata to indicate whether the virtual disk is consistent. The background initialize checkpoint value includes a logical block address (stripe) for the virtual disk that represents a checkpoint for a background initialization process.

Block flags and identifiers include a block valid data (BlockValidData) indication, a data written on inconsistent stripe (DataWrittenOnInconsistentStripe) identifier. The block flags and identifiers are defined for every block in a virtual disk and are stored in the region of the block outside the data area for the block (See FIG. 4). The block valid data indication indicates that a block contains valid data written by a host (blocks having this indication or flag set indicate that the block needs to be rebuilt). The block valid data indication is set by the RAID controller firmware 240 for every block that is written as a result of a host write operation. The block valid data indication is used by the rebuild task to determine if the stripe needs to be rebuilt. The data written on inconsistent stripe identifier is an identifier that is used by the RAID controller firmware 240 to track writes on inconsistent stripes (if background initialization is supported with fast rebuild). When the RAID controller 120 is writing to a block that is not consistent, it uses this flag to so indicate. When the initialization task detects this identifier on a block, then during a background initialization process, the controller does not reset the block valid data indication, but clears the data written on inconsistent stripe identifier. The data written on inconsistent stripe identifier is also used by the rebuild task to determine whether a stripe needs to be rebuilt in the inconsistent part of a virtual disk, if a rebuild process is started as a result of a disk failure that happened prior to completion of a background initialization process.

Figure 3:
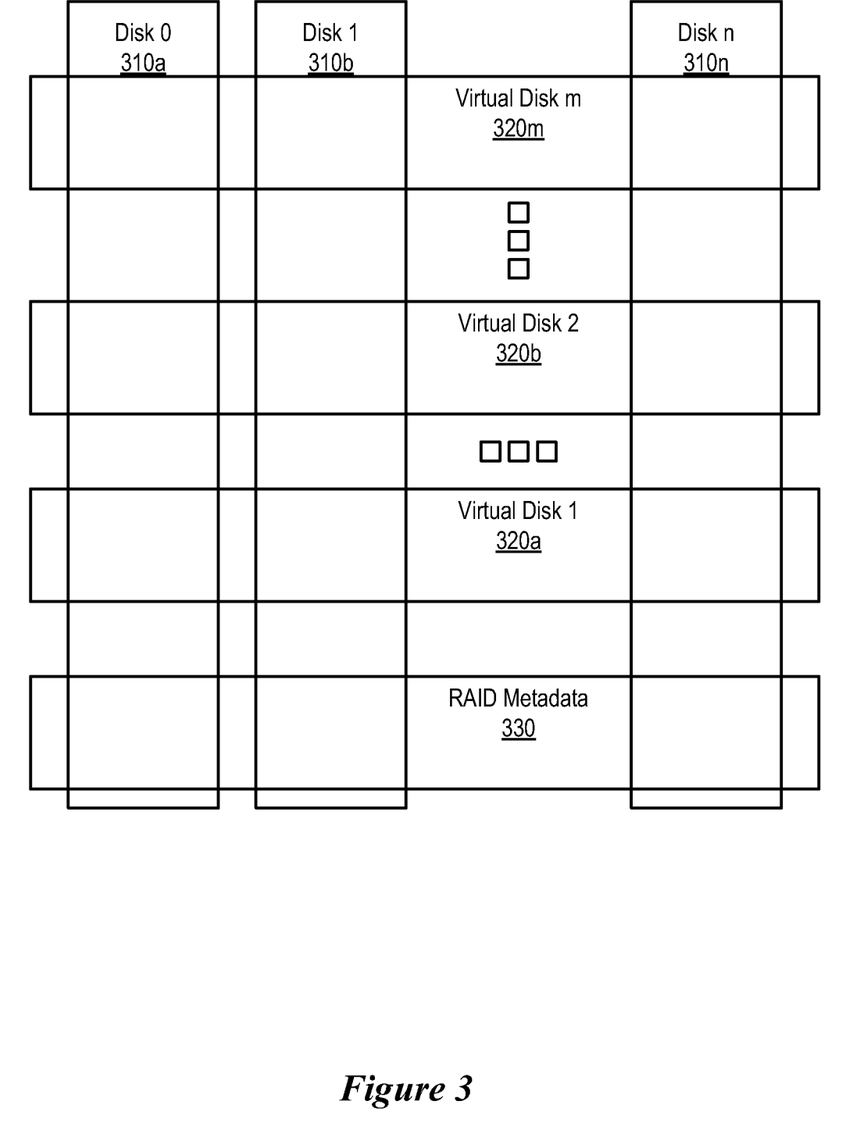
FIG. 3 shows a block diagram of an organization of disks, virtual disks, and RAID metadata.

FIG. 3 shows a block diagram of a typical organization of disks, virtual disks, and RAID metadata within a RAID system 122. More specifically, the RAID system 122 includes a plurality of disks 310 (Disk 0, Disk 1, Disk n) which are controlled via the RAID controller 120. The RAID system 122 also includes a plurality of virtual disks 320 (Virtual Disk 1, Virtual Disk 2, Virtual Disk m), which are stored across the plurality of disks 310. The RAID system 122 also includes RAID metadata 330 that is stored across the plurality of disks 310.

Figure 4:
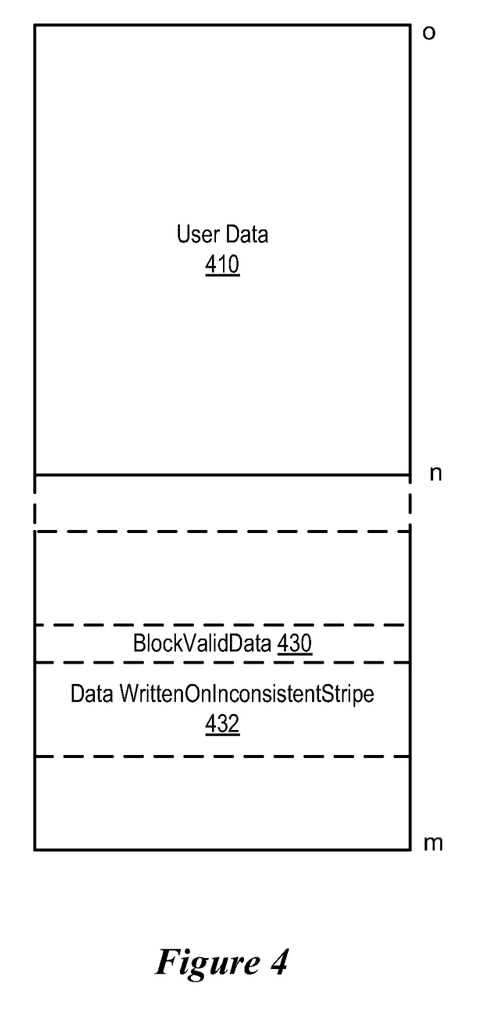
FIG. 4 shows a block diagram of a block of data.

FIG. 4 shows a diagram of a block of data. More specifically, a block of data includes user data 410 as well as block information which is separated from the user data 410. The block information also includes the block valid data indication 430 as well as the data written on inconsistent stripe indication 432.

Figure 5:
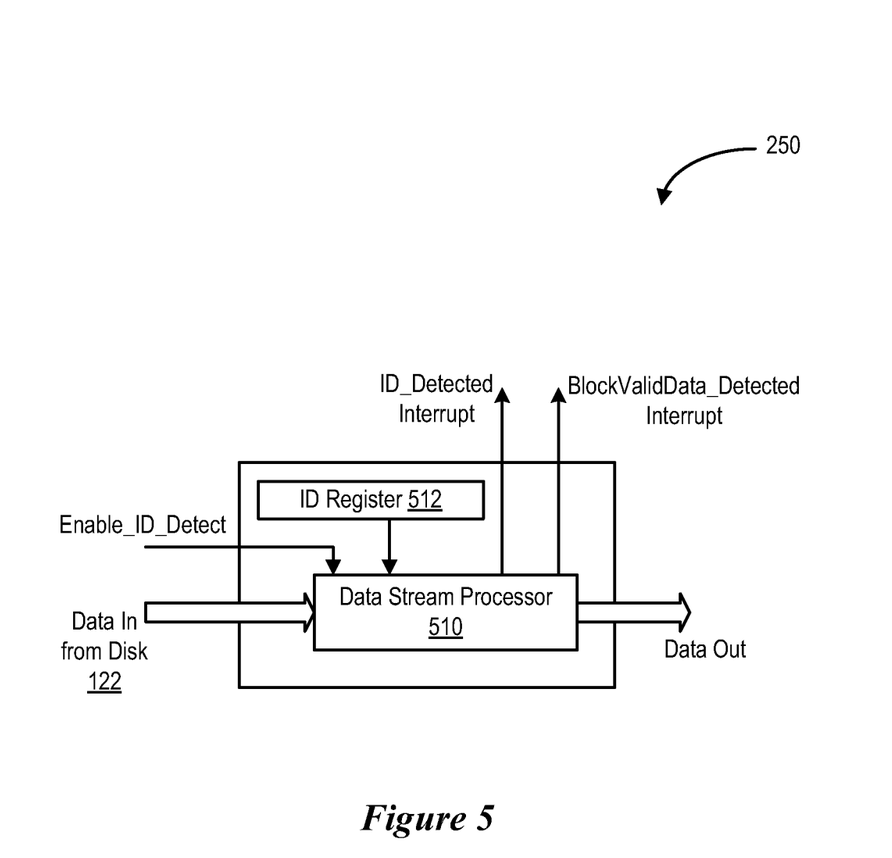
FIG. 5 shows a block diagram of flag and ID detection logic.

FIG. 5 shows a block diagram of flag and ID detection logic 250. More specifically, the flag and ID detection logic 250 includes a data stream processor 510 as well as an ID register 512. The data stream processor 510 of the IO controller 230 receives data read from physical disks that are part of the RAID system 122. The data stream processor 510 receives an input from the ID register 512. When ID detection is enabled, the contents of this register is that the ID that is used by the RAID controller to indicate the data written on an inconsistent stripe. The ID detection is used when a background initialization operation or rebuild operation is being performed.

The data stream processor also receives an enable ID detect (Enable_ID_Detect) signal, and generates an ID detected (ID_Detected) Interrupt and a block valid data detected (BlockValidData_Detected) interrupt. The enable ID detect signal enables detection of ID programmed into the ID register 512 in the data read from the RAID system 122. The ID detected interrupt is generated when the processor detects the ID programmed in the ID register 512 in the data stream read from disk drives, when the Enable_ID_Detect signal is asserted. The block valid data detected interrupt occurs when the processor detects block valid data value.

Figure 6:
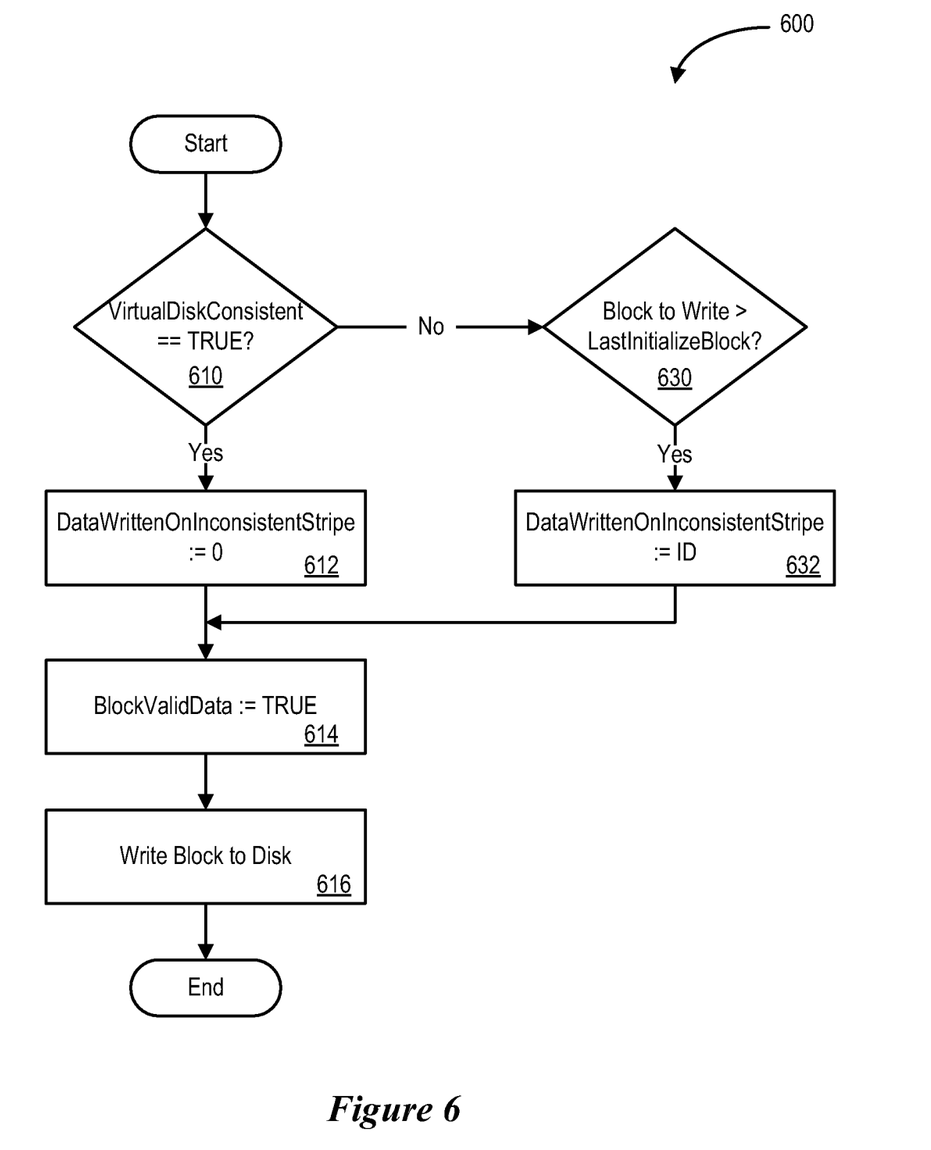
FIG. 6 shows a flow chart of a write operation.

FIG. 6 shows a flow chart of a write operation 600 for the RAID system 112. More specifically, during a write operation 600, the virtual disk consistent indication is analyzed to determine whether the indication is set (i.e., is TRUE) at step 610. If the virtual disk consistent indication is set, then the data written on inconsistent strip indication is set to zero at step 612. Next, the block valid data indication is set true at step 614 and the block of data is written to the disk system 112 at step 616.

If the virtual disk consistent indication is not set (i.e., is not TRUE), then the block to write is analyzed to determine whether the block is greater than the last initialize block at step 630 (i.e., is after the last initialized block). If the block to write is greater than the last initialized block, then the data written on inconsistent strip indication is set to the block at step 632. Next, the block valid data indication is set true at step 614 and the block of data is written to the disk system 112 at step 616.

Figure 7:
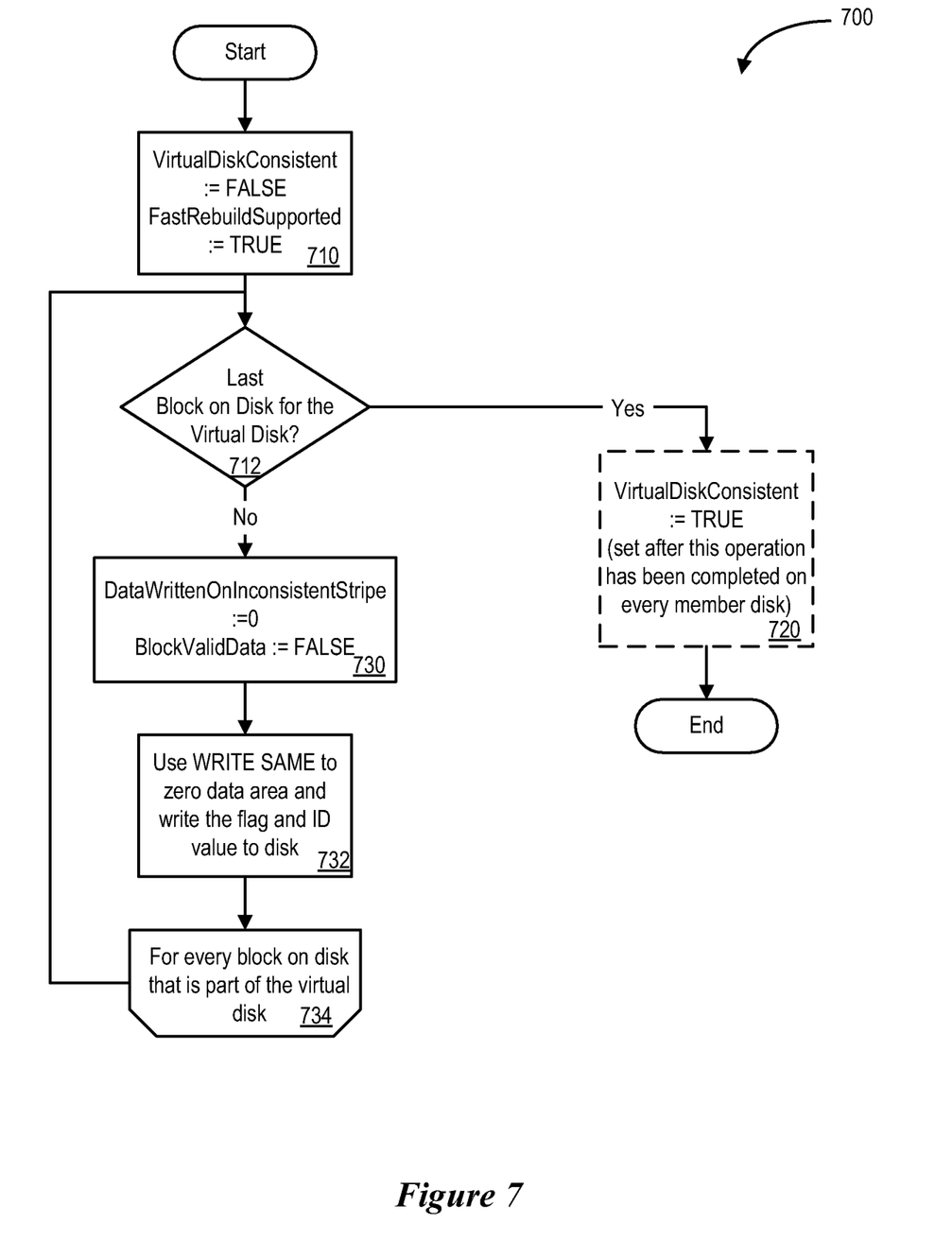
FIG. 7 shows a flow chart of a foreground initialization operation.

FIG. 7 shows a flow chart of a foreground initialization operation 700 with fast rebuild enabled. When fast rebuild is enabled, host 10 operations are blocked until initialization completes. More specifically, during the foreground initialization operation starts operation by setting the virtual disc consistent value to false and the fast rebuild supported value to true at step 710. Next, the IOP 210 determines whether the present block to be initialized is the last block on the disk for the virtual disk at step 710.

If the block is not the last block on the disk, then the data written on inconsistent stripe value is set to zero and the block valid data value is set to false at step 730. Next, a WRITE SAME operation is used to zero the data area and to write the block valid data flag and the data written on inconsistent stripe ID value to the disk at step 732. Steps 730 and 732 are repeated for every block that is on the disk that is part of the virtual disk.

The virtual disk consistent value is set to true when the process is completed on every member of the virtual disk that is being initialized within the RAID system 122.

Figure 8A:
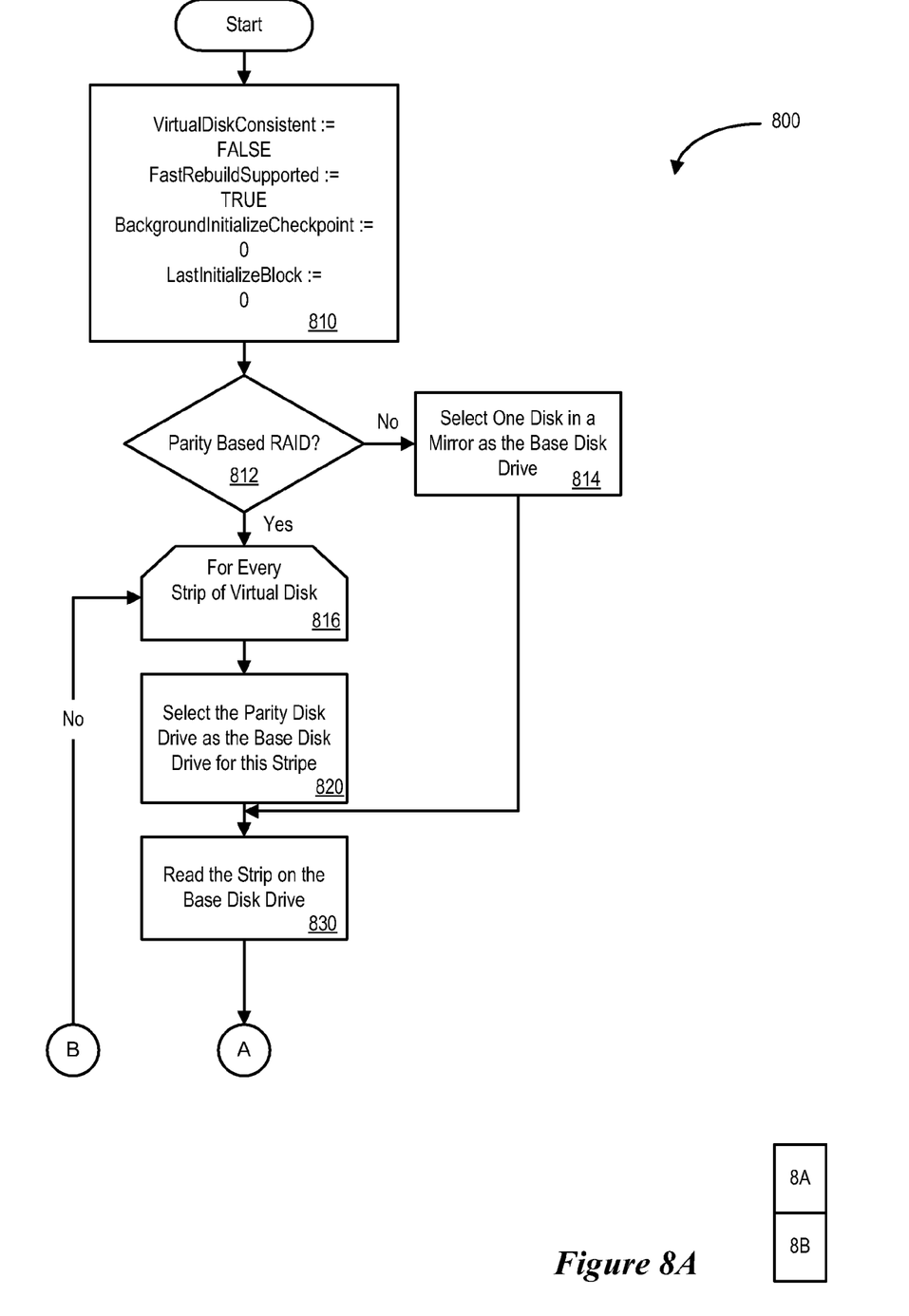
FIGS. 8a and 8b, generally referred to as FIG. 8, show a flow chart of a background initialization operation.
Figure 8B:
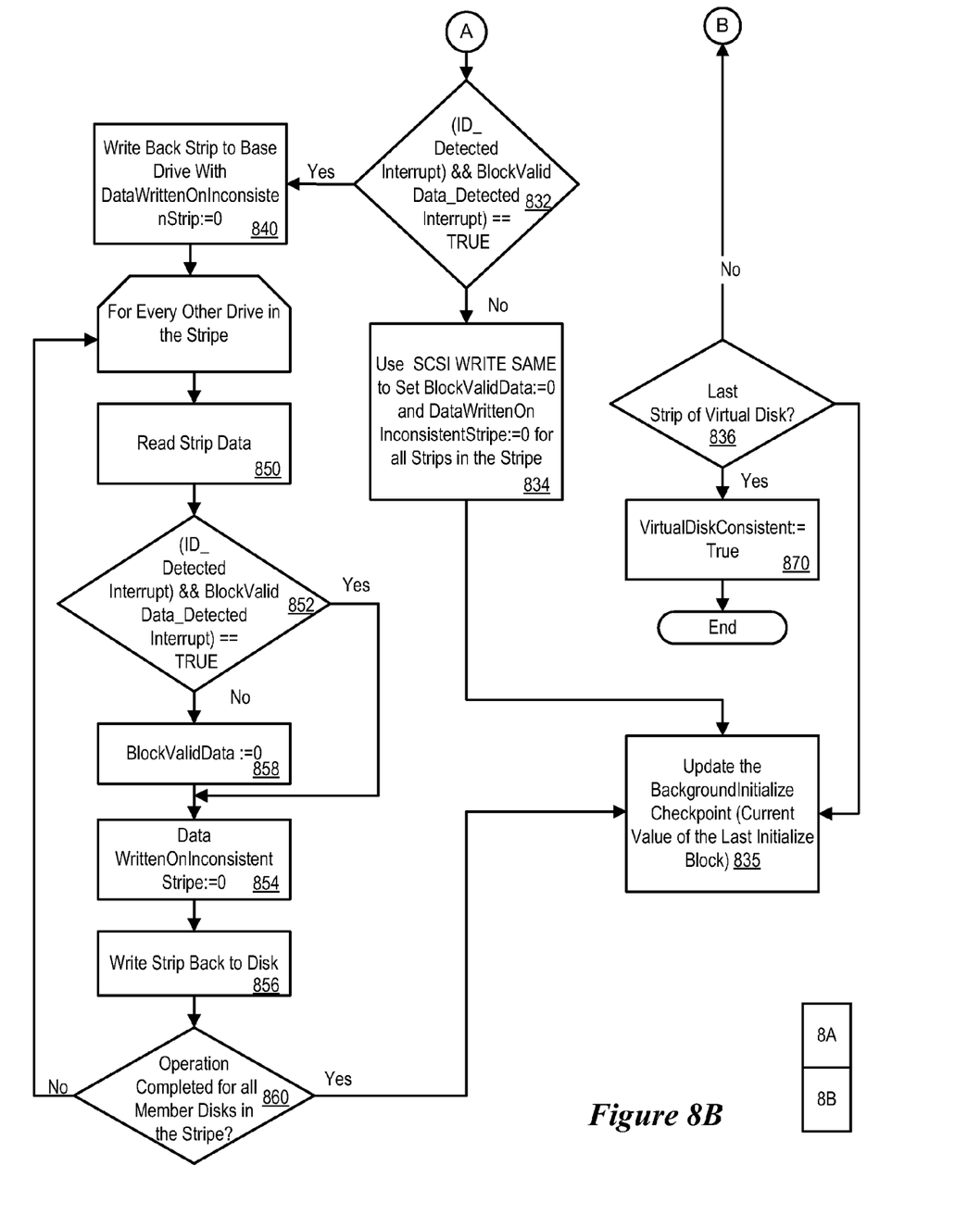

FIG. 8 shows a flow chart of a background initialization operation 800. More specifically, a background initialization operation 800 starts by setting the virtual disk consistent value to FALSE, the fast rebuild supported value to TRUE where the background initialize the checkpoint value to Zero and the last initialize block value to zero at step 810. Next, the IOP 210 determines whether the RAID system is configured as a parity based RAID at step 812. If the system is not configured as a parity based RAID, then the RAID system 122 is configured as a mirror system and one disk is selected at the base drive at step 814. If the system is configured as a parity based RAID system then for every stripe of the virtual disk, the IOP 210 selects a parity drive as the base drive at step 820.

Next, the IOP 210 reads data from the base disk strip at step 830. Next, the ID detected interrupt and the block valid data detected interrupt are monitored at step 832. If these interrupts are not present, then a WRITE SAME operation is used to set the block valid data value to zero and the data written on inconsistent stripe value to zero for all strips in the stripe of the block at step 834. If the strip is not the last strip of the virtual disk, then the system returns to step 816 to process the next stripe in the virtual disk.

If at step 832, the ID detected interrupt and the block valid data detected interrupt are present, then the system writes back the strip to the base drive with a value of data written on inconsistent stripe value set to zero at step 840. Next for every other drive in the strip at step 842, the system reads the strip data at step 850. Next, the ID detected interrupt and the block valid data detected interrupt are monitored at step 852. If the ID detected interrupt and the block valid data detected interrupt are present, then the data written on inconsistent stripe value is set to zero at step 854 and the system writes the strip back to the disk at step 856. If the ID detected interrupt and the block valid data detected interrupt are not present, then the block valid data value is set to zero at step 858. The data written on inconsistent stripe value is set to zero and the system writes the strip back to the disk at step 856.

After the system writes the strip back to the disk at step 856, the system determines whether all member disks in the stripe have completed processing at step 860. If all members in the strip have not completed processing, then the system reads the next strip data at step 850. If all members in the strip have completed processing, then at step 836 the system updates the background initialize checkpoint value at step 835 to indicate that this stripe of the virtual disk has completed background initialization.

At step 836, the system checks if the last stripe processed was the last stripe of the virtual disk. If there are more stripes in the virtual disk to process, the system returns to step 816 to continue the background initialization process. At step 836, if the last stripe processed is the last stripe of the virtual disk, then the system sets the virtual disk consistent value to TRUE at step 870 and completes the background initialization operation.

Figure 9A:
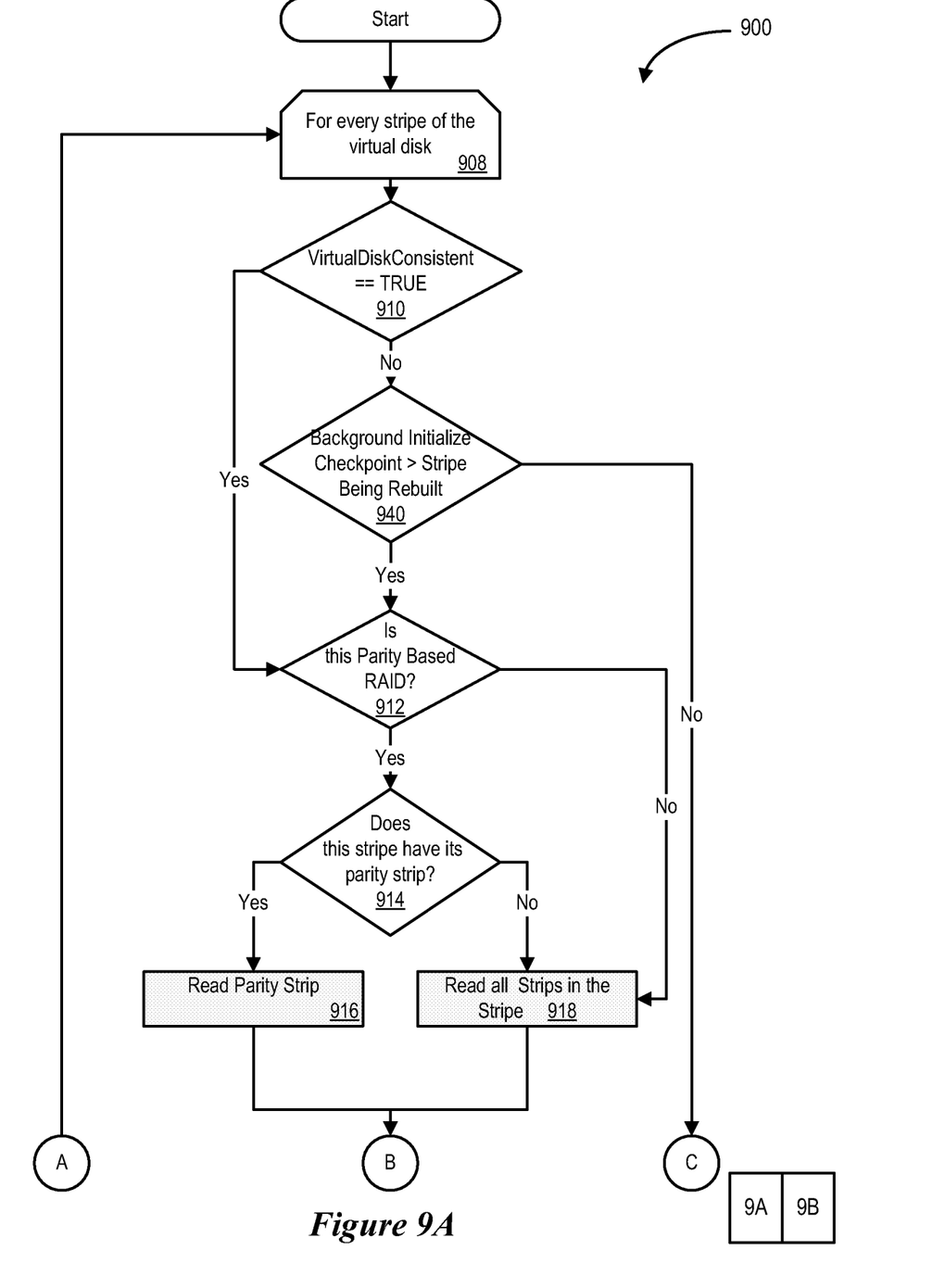
FIGS. 9a and 9b, generally referred to as FIG. 9, show a flow chart of a fast rebuild operation.
Figure 9B:
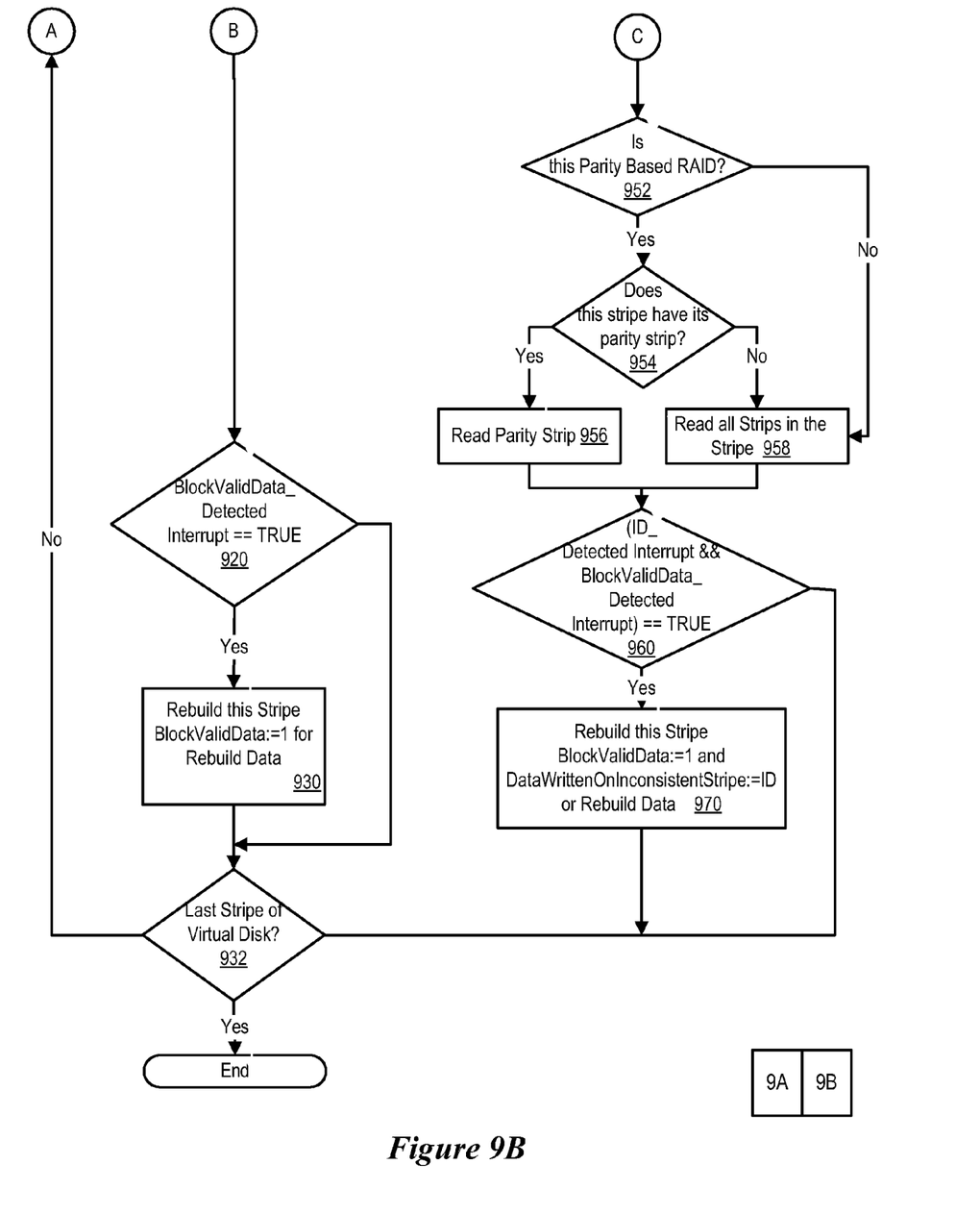

FIG. 9 shows a flow chart of a fast rebuild operation 900. Prior to starting the rebuild operation, all flags have to be cleared on the disk to which rebuild will be performed prior to start of the rebuild (such as by using a WRITE SAME operation (a WRITE SAME operation does not require any data transfer to the disk)). For every stripe in the virtual disk at step 908, a fast rebuild operation determines whether the virtual disk consistent value is TRUE at step 910. If the virtual disk consistent value is TRUE, then the IOP 210 determines whether the RAID system 122 is a parity based RAID system at step 912.

If the RAID system 122 is a parity based RAID system, then the IOP 210 determines whether the stripe includes a corresponding parity stripe at step 914. If the stripe does include its corresponding parity strip then the IOP 210 reads the strip data at step 916. If the stripe does not include it corresponding parity strip, then the IOP 210 reads all strips in the stripe at step 918.

If, at step 912, the IOP 210 determines that the RAID system 122 is not a parity based RAID system, then the IOP 210 reads all strips in the stripe at step 918. After all strips in the stripe are read or the strip data is read, the IOP 210 determines whether the block valid data detected interrupt is present at step 920.

If the block valid data detected interrupt is present, then the IOP rebuilds this stripe and sets the block valid data value to one for the rebuild data at step 930. If the block valid data detected interrupt is not present, then this stripe does not need to be rebuilt. Next, the IOP 210 determines whether all stripes have completed the rebuild operation at step 932. If all stripes have completed, then the rebuild operation completes.

If, at step 910, the IOP 210 determines that the virtual disk consistent value is not TRUE, then the IOP 210 determines whether the background initialize checkpoint value is greater than the current stripe that needs to be rebuilt (as indicated by the rebuild stripe value) at step 940. Stripes with blocks with logical block addresses less than the background initialize checkpoint are consistent, while stripes with logical block addresses greater than the background initialize checkpoint are inconsistent. If the background initialize checkpoint value is greater than the rebuild stripe value, then the rebuild operation proceeds to step 912. If the background initialize checkpoint value is not greater than the rebuild stripe value, then the IOP 210 determines whether the RAID system 122 is a parity based RAID system at step 952.

If the RAID system 122 is a parity based RAID system, then the IOP 210 determines whether the stripe includes a corresponding parity stripe at step 954. If the stripe does include its corresponding parity strip then the IOP 210 reads the strip data at step 956. If the stripe does not include it corresponding parity strip, then the IOP 210 reads all strips in the stripe at step 958.

If, at step 952, the IOP 210 determines that the RAID system 122 is not a parity based RAID system, then the IOP 210 reads all strips in the stripe at step 958. After all strips in the stripe are read or the strip data is read, the IOP 210 determines whether the ID detected interrupt and the block valid data detected interrupt are present at step 960.

If the ID detected interrupt and the block value data detected interrupt are present, then the IOP rebuilds this stripe and sets the block valid data value to one for the rebuild data at step 970. Next, the IOP 210 determines whether all stripes have completed the rebuild operation at step 932. If all stripes have completed, then the rebuild operation completes. If a background initialization process was executing on the virtual disk when a drive failure occurred, the process is paused and then restarted on the virtual disk when the rebuild process completes.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

In addition, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for performing a background initialization fast rebuild operation on a Redundant Array of Inexpensive Disks (RAID) system comprising:
providing the RAID system with a virtual disk portion and a disk metadata portion, the disk metadata portion storing a fast rebuild operation indication to indicate whether the RAID system supports a fast rebuild operation and a virtual disk consistent indication to indicate whether the virtual disk is consistent;
providing each block within the RAID system with a user data portion and a block information portion, the block information portion including a valid block data indication;
setting the virtual disk consistent indication to false;
determining whether a block has valid data;

indicating that the block has valid data via the valid block data indication;

rebuilding only blocks that contain valid data after a disk drive failure based upon the fast rebuild operation indication and the valid block data indications; and, after all blocks, containing valid data have been rebuilt, setting the virtual disk consistent indication to true; and wherein the fast rebuild operation comprises determining, for every stripe in the virtual disk portion, whether the virtual disk consistent indication value is TRUE;

determining whether the RAID system is a parity based RAID system if the virtual disk consistent value is TRUE;

determining whether a stripe in the virtual disk portion includes a corresponding parity strip if the RAID system is a parity based RAID system, if the stripe does include the corresponding parity strip, then reading strip data of the stripe, if the stripe does not include the corresponding parity strip, then reading all strips in the stripe;

if the RAID system is not a parity based RAID system, then reading all strips in the stripe, after all strips in the stripe are read, determining whether the block valid data detected interrupt is present;

if the block valid data detected interrupt is present, then rebuilding this stripe and setting the block valid data value active for the rebuild data, if the block valid data detected interrupt is not present, then this stripe does not need to be rebuilt;

determining whether all stripes have completed the fast rebuild operation, if all stripes have completed, then completing the rebuild operation.

2. The method of claim 1 further comprising
clearing the valid block data indication on blocks that are no longer in use within the RAID system.

3. The method of claim 1 wherein
the block information portion further comprises a data written on inconsistent stripe identifier, the data written on inconsistent stripe identifier enabling the RAID controller to track writes on inconsistent stripes.

4. The method of claim 1 wherein
the RAID system comprises a storage controller.

5. The method of claim 1 wherein
the block information portion is not accessible to an end user.

6. An apparatus for performing a background initialization fast rebuild operation on a Redundant Array of Inexpensive Disks (RAID) system comprising:

a virtual disk portion and a disk metadata portion, the disk metadata portion storing a fast rebuild operation indication to indicate whether the RAID system supports a fast rebuild operation and a virtual disk consistent indication to indicate whether the virtual disk is consistent, means for providing each block within the RAID system with a user data portion and a block information portion, the block information portion including a valid block data indication;

means for setting the virtual disk consistent indication to false;

means for determining whether a block has valid data;

means for indicating that the block has valid data via the valid block data indication; and, means for rebuilding only blocks that contain valid data after a disk drive failure based upon the fast rebuild operation indication and the valid block data indications; and, means for setting the virtual disk consistent indication to true after all blocks containing valid data have been rebuilt; and wherein the fast rebuild operation comprises determining, for every stripe in the virtual disk portion, whether the virtual disk consistent indication value is TRUE;

determining whether the RAID system is a parity based RAID system if the virtual disk consistent value is TRUE;

determining whether a stripe in the virtual disk portion includes a corresponding parity strip if the RAID system is a parity based RAID system, if the stripe does include the corresponding parity strip, then reading strip data of the stripe, if the stripe does not include the corresponding parity strip, then reading all strips in the stripe;

if the RAID system is not a parity based RAID system, then reading all strips in the stripe, after all strips in the stripe are read, determining whether the block valid data detected interrupt is present;

if the block valid data detected interrupt is present, then rebuilding this stripe and setting the block valid data value active for the rebuild data, if the block valid data detected interrupt is not present, then this stripe does not need to be rebuilt;

determining whether all stripes have completed the fast rebuild operation, if all stripes have completed, then completing the rebuild operation.

7. The apparatus of claim 6 further comprising
means for clearing the valid block data indication on blocks that are no longer in use within the RAID system.

8. The apparatus of claim 6 wherein
the block information portion further comprises a data written on inconsistent stripe identifier, the data written on inconsistent stripe identifier enabling the RAID controller to track writes on inconsistent stripes.

9. The apparatus of claim 6 wherein
the RAID system comprises a storage controller.

10. The apparatus of claim 6 wherein
the block information portion is not accessible to an end user.

11. An information handling system comprising:

a processor;

a memory coupled to the processor;

a Redundant Array of Inexpensive Disks (RAID) system, the RAID system being capable of performing a background initialization fast rebuild operation, the RAID system comprising a virtual disk portion and a disk metadata portion, the disk metadata portion storing a fast rebuild operation indication to indicate whether the RAID system supports a fast rebuild operation and a virtual disk consistent indication to indicate whether the virtual disk is consistent, the RAID system further comprising instructions for providing each block within the RAID system with a user data portion and a block information portion, the block information portion including a valid block data indication;

setting the virtual disk consistent indication to false;

determining whether a block has valid data;

indicating that the block has valid data via the valid block data indication; and, rebuilding only blocks that contain valid data after a disk drive failure based upon the fast rebuild operation indication and the valid block data indications; and, after all blocks, containing valid data have been rebuilt, setting the virtual disk consistent indication to true; and wherein the fast rebuild operation comprises determining, for every stripe in the virtual disk portion, whether the virtual disk consistent indication value is TRUE;

determining whether the RAID system is a parity based RAID system if the virtual disk consistent value is TRUE;

determining whether a stripe in the virtual disk portion includes a corresponding parity strip if the RAID system is a parity based RAID system, if the stripe does include the corresponding parity strip, then reading strip data of the stripe, if the stripe does not include the corresponding parity strip, then reading all strips in the stripe;

if the RAID system is not a parity based RAID system, then reading all strips in the stripe, after all strips in the stripe are read, determining whether the block valid data detected interrupt is present;

if the block valid data detected interrupt is present, then rebuilding this stripe and setting the block valid data value active for the rebuild data, if the block valid data detected interrupt is not present, then this stripe does not need to be rebuilt;

determining whether all stripes have completed the fast rebuild operation, if all stripes have completed, then completing the rebuild operation.

12. The information handing system of claim 11 wherein the RAID system further comprises instructions for clearing the valid block data indication on blocks that are no longer in use within the RAID system.

13. The information handling system of claim 11 wherein the block information portion further comprises a data written on inconsistent stripe identifier, the data written on inconsistent stripe identifier enabling the RAID controller to track writes on inconsistent stripes.

14. The information handling system of claim 11 wherein the RAID system comprises a storage controller.

15. The information handling system of claim 11 wherein the block information portion is not accessible to an end user.

* * * * *